(12) United States Patent
Kiesewetter-Michler

(10) Patent No.: US 12,292,142 B2
(45) Date of Patent: May 6, 2025

(54) LINE COUPLING ASSEMBLY

(71) Applicant: Bayerische Motoren Werke Aktiengesellschaft, Munich (DE)

(72) Inventor: Rolf Kiesewetter-Michler, Eching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 31 days.

(21) Appl. No.: 17/918,613

(22) PCT Filed: Apr. 28, 2021

(86) PCT No.: PCT/EP2021/061070
§ 371 (c)(1),
(2) Date: Oct. 13, 2022

(87) PCT Pub. No.: WO2021/239365
PCT Pub. Date: Dec. 2, 2021

(65) Prior Publication Data
US 2023/0144489 A1 May 11, 2023

(30) Foreign Application Priority Data
May 26, 2020 (DE) ...................... 10 2020 114 117.3

(51) Int. Cl.
*F16L 37/252* (2006.01)
*F16L 37/244* (2006.01)
(52) U.S. Cl.
CPC .......... *F16L 37/252* (2013.01); *F16L 37/244* (2013.01)
(58) Field of Classification Search
CPC .............................. F16L 37/257; F16L 27/252
See application file for complete search history.

(56) References Cited

U.S. PATENT DOCUMENTS 99,744 A * 2/1870 Alford et al. ......... F16L 37/252
285/361
103,785 A * 5/1870 Sewell .................. F16L 37/252
285/70

(Continued)

FOREIGN PATENT DOCUMENTS

CN   101968145 A   2/2011
CN   102124261 A   7/2011

(Continued)

OTHER PUBLICATIONS

International Search Report (PCT/ISA/210) issued in PCT Application No. PCT/EP2021/061070 dated Jul. 13, 2021 with English translation (four (4) pages).

(Continued)

*Primary Examiner* — Matthew Troutman
*Assistant Examiner* — Fannie Kee
(74) *Attorney, Agent, or Firm* — Crowell & Moring LLP

(57) ABSTRACT

A line coupling assembly for a motor vehicle includes a line coupling, a first line, and a second line which can be coupled to the first line via the line coupling, wherein at their coupling-side ends, which are supposed to be connected, the lines each have a coupling component which, when the lines are completely coupled, interact such that the lines are tightly coupled together. When the lines are not completely coupled, the coupling components interact such that there is a defined inspection gap near the line coupling.

13 Claims, 3 Drawing Sheets

(56) References Cited

U.S. PATENT DOCUMENTS

| | | | | |
|---|---|---|---|---|
| 520,239 | A | * | 5/1894 | Merrick ................ F16L 37/252 217/99 |
| 554,666 | A | * | 2/1896 | Feltner ................. F16L 37/252 285/259 |
| 699,366 | A | * | 5/1902 | Bowes, Jr. ............ F16L 37/252 279/93 |
| 789,541 | A | * | 5/1905 | Hayes ................... F16L 37/252 285/376 |
| 793,869 | A | * | 7/1905 | Anderson et al. .... F16L 37/252 285/361 |
| 813,792 | A | * | 2/1906 | Gooch et al. ......... F16L 37/252 285/332.4 |
| 967,679 | A | * | 8/1910 | Shepheard ............ F16L 37/252 285/376 |
| 1,000,642 | A | * | 8/1911 | Thomas et al. ....... F16L 37/252 251/149 |
| 1,011,284 | A | * | 12/1911 | Utz et al. .............. F16L 37/252 285/376 |
| 1,217,805 | A | * | 2/1917 | Myers ................... F16L 37/248 285/396 |
| 3,179,444 | A | * | 4/1965 | Lansky ................. F16L 37/252 285/308 |
| 5,651,732 | A | * | 7/1997 | Dufour ................. F16L 37/252 126/307 R |
| 8,505,981 | B2 | * | 8/2013 | Jacklich ................ F16L 37/252 285/123.1 |
| 8,672,367 | B2 | * | 3/2014 | Jacklich ................ F16L 37/252 285/402 |
| 2005/0017504 | A1 | | 1/2005 | Sandborn et al. |
| 2007/0249197 | A1 | | 10/2007 | Spranger et al. |
| 2011/0148107 | A1 | | 6/2011 | Blivet |
| 2012/0169044 | A1 | | 7/2012 | Kendrick |
| 2017/0216572 | A1 | | 8/2017 | Stenzel et al. |
| 2021/0231245 | A1 | * | 7/2021 | Sanzone ............... F16L 37/252 |

FOREIGN PATENT DOCUMENTS

| | | | | |
|---|---|---|---|---|
| CN | 202418986 | U | | 9/2012 |
| CN | 107029344 | A | | 8/2017 |
| DE | 602 08 713 | T2 | | 9/2006 |
| DE | 10 2006 016 211 | A1 | | 10/2007 |
| DE | 10 2007 032 027 | A1 | | 2/2009 |
| DE | 10 2011 057 162 | A1 | | 7/2012 |
| GB | 1594982 | A | * | 8/1981 ............ F16L 37/252 |
| GB | 2155985 | A | * | 10/1985 ............ F16L 37/252 |
| GB | 2471851 | A | * | 1/2011 ............ F16L 37/252 |
| WO | WO 2009/024807 | A1 | | 2/2009 |

OTHER PUBLICATIONS

German-language Written Opinion (PCT/ISA/237) issued in PCT Application No. PCT/EP2021/061070 dated Jul. 13, 2021 (five (5) pages).

German-language Search Report issued in German Application No. 10 2020 114 117.3 dated Feb. 15, 2021 with partial English translation (10 pages).

Chinese language Office Action issued in Chinese Application No. 202180024367.5 dated Feb. 14, 2025 with English translation (19 pages).

* cited by examiner

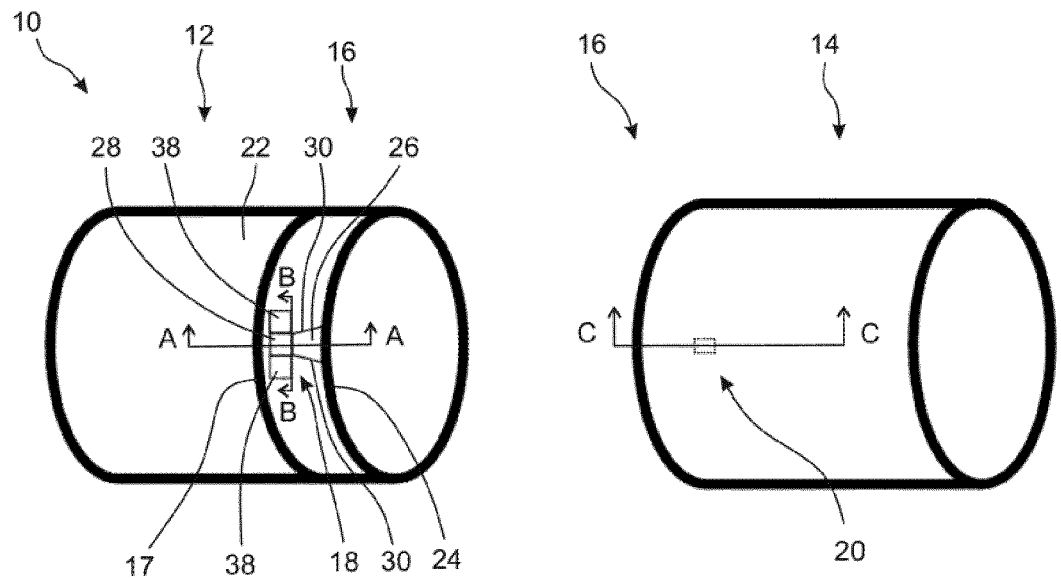
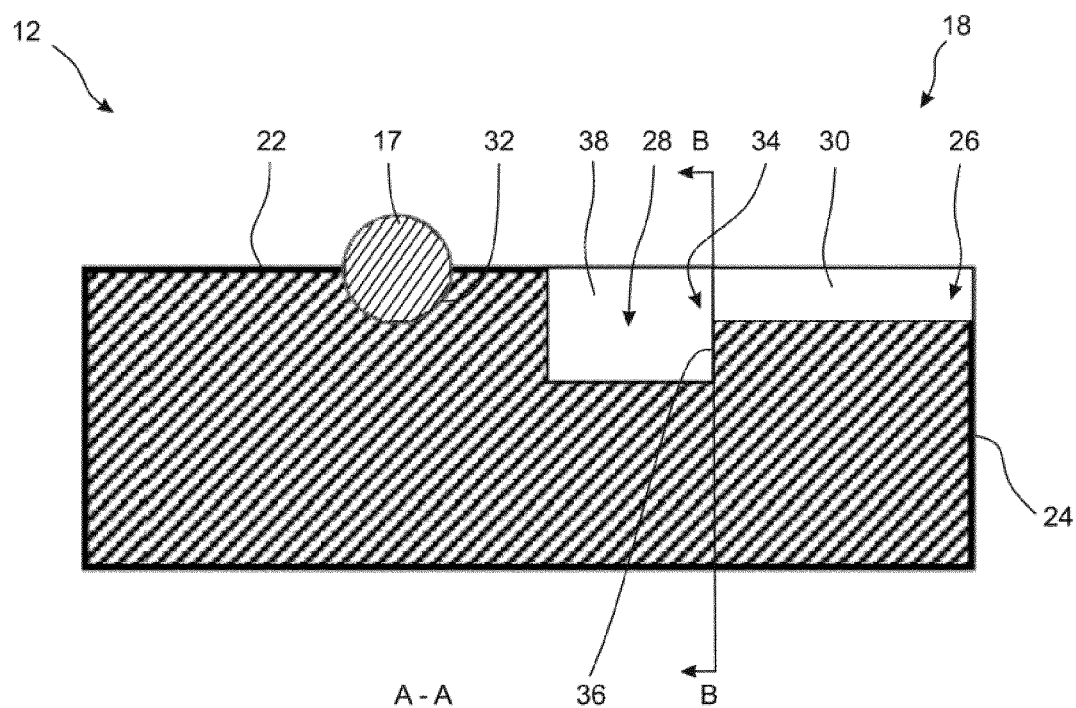
Fig. 1
Fig. 2

D - D

LINE COUPLING ASSEMBLY

BACKGROUND AND SUMMARY

The invention relates to a line coupling assembly for a motor vehicle.

In some countries, high demands are placed on line couplings in automotive construction. A diagnosis of the correct installation is prescribed by law in some countries, since damage relatively often occurs to a seal of the line coupling assembly during the assembly of conventional line coupling assemblies.

Such damage to the seal or other components of the line coupling assembly normally gradually leads to leakage of the line coupling assembly.

In addition, the assembly of conventional line coupling assemblies is relatively complex, since the lines are normally coupled via additional, separate securing means, for example screws or grooves.

The object of the invention is to provide a tight line coupling assembly which can be assembled and disassembled easily and quickly and in which a leak can be diagnosed quickly and easily.

According to the invention, this object is achieved by a line coupling assembly for a motor vehicle, in particular for ventilation lines of the motor vehicle, for example for ventilation lines of a crankcase, or ventilation lines of a tank, or other lines for fluids, in particular gaseous fluids. The line coupling assembly has a line coupling, a first line and a second line, which can be coupled to the first line via the line coupling, wherein the coupling-side ends to be connected of the lines each have a coupling component which, when the lines are completely coupled, interact such that the lines are coupled tightly to each other. When the lines are not completely coupled, the coupling components interact in such a way that there is a defined inspection gap in the area of the line coupling. Accordingly, when not completely coupled, the lines are not reliably coupled to each other, the inspection gap representing an intended leaky point by means of which the ability to diagnose the faulty incomplete coupling quickly and correctly can be ensured. Here, the defined inspection gap means that the size of the gap is defined or, in other words, that the gap has a defined size (height, width and/or length).

In particular, the line coupling is formed by the coupling components, which are each attached separately to the lines or are formed in one piece on the lines.

Provision can be made for the first line to comprise a female end piece and/or for the second line to comprise a male end piece, the end pieces each having the appropriate coupling component. The end pieces can be formed by the respective line or be attached separately to the respective line.

For example, the coupling component of the first line is assigned to an outer wall of the first line, in particular arranged or formed thereon, and/or the coupling component of the second line is assigned to an inner wall of the second line, in particular arranged or formed thereon.

According to one aspect, when completely coupled, the coupling components interengage in a form-fitting manner and/or the complete coupling can be released by rotating the lines relative to each other in their circumferential direction. Accordingly, the coupling comprises a type of bayonet connection. In this way, no screw connection or the like is necessary, as a result of which, firstly, quick and simple assembly and disassembly is possible and, secondly, no local deformations occur as a result of the local securing, for example by a screw connection, owing to which a leakage can be caused in other areas.

A further aspect provides for a seal to be arranged in the respective circumferential direction on an outer wall of the first line or on an inner wall of the second line, in particular in a circumferential groove in the wall, wherein the seal is arranged between the walls when the lines are coupled. When the lines are coupled completely by the coupling, the seal provides sealing between the walls. A tight coupling is thus created. If the lines are not completely coupled, the inspection gap is formed between the walls and is large enough that the seal can no longer provide sealing between the walls. Thus, a leaky coupling is created, wherein the incomplete coupling of the line can be diagnosed quickly and easily by way of the inspection gap and the leakage produced.

For example, the seal is a sealing ring and/or the groove is an annular groove, in particular a circumferential groove on the outer side.

A radially protruding sealing projection which presses radially against the seal when the lines are completely coupled can be provided on an outer wall of the first line or on an inner wall of the second line, in particular on the wall on which the seal is not arranged. In this way, the corresponding wall bears still more tightly against the seal, so that the tightness between the lines can be improved further. When the coupling is incomplete, the resulting inspection gap is large enough that the sealing projection no longer presses against the seal, at least in some sections.

In one embodiment, one of the coupling components is an indentation in a wall of the corresponding line which, starting from a coupling-side end face of the line, extends away from the coupling-side end face in the axial direction, in particular wherein the indentation ends in front of the seal in the axial direction. Part of the form-fitting connection is formed by the indentation, wherein the indentation has a boundary in front of the seal, so that the mating part of the form-fitting connection on the other line cannot be brought up as far as the seal or beyond the seal. In this way, damage to the seal is reliably prevented.

In particular, the indentation has a guide section and a fastening section, wherein, starting from the coupling-side end face, the guide section extends away from the coupling-side end face in an axial direction, and the fastening section adjoins the guide section in an axial direction at a distance from the coupling-side end face. By means of the guide section, the coupling components of the other line can be guided easily up to the fastening section and can be fastened easily and reliably in the fastening section, in particular by a form fit. Here, the guide section merges directly into the fastening section, so that the guide section and the fastening section are connected directly to each other.

For example, the fastening section, seen in the radial direction, is deeper than the guide section. Thus, the coupling component of the other line can be accommodated in the fastening section, in particular the coupling component of the other line engaging behind the guide section in a form-fitting manner, which forms a form-fitting latching connection.

In one embodiment, the fastening section is adjoined in the circumferential direction of the corresponding line by at least one ramp section, which connects a surface of the wall in which the indentation is arranged to a base area of the indentation. In this way, the coupling component of the other line which engages in the fastening section can move out of the fastening section along the ramp section toward the surface of the wall as a result of the lines being rotated relative to each other in the circumferential direction. As a result, the form fit is cancelled and the lines can easily be separated from each other.

A further embodiment provides for the guide section to have lateral guide walls which delimit a guide channel, the guide channel tapering from the coupling-side end face toward the fastening section. Thus, a wide "entry area" can be created on the coupling-side end face, as a result of which the coupling component of the other line can easily be introduced into the guide section and can be reliably guided to the fastening section by the guide walls.

For example, one of the coupling components is a latching lug protruding in a radial direction on one of the walls, in particular wherein the latching lug is spaced further apart in an axial direction from a coupling-side end face of the corresponding line than the seal. The latching lug can be guided along the guide section of the indentation to the fastening section of the indentation and can latch into the fastening section, as a result of which the guide section is gripped from behind. With respect to the wall of the line having the latching lug, the seal is arranged between the end face and the latching lug.

In particular, the latching lug extends in the manner of a ramp in an axial direction toward the wall to a coupling-side end of the corresponding line and/or, at the end facing away from the coupling-side end, the latching lug extends substantially orthogonally toward the wall, so that a step is formed. As a result of the ramp-like section, the latching lug can slide easily on the end face of the other line and can be pushed onto the guide section. In the completely coupled state, the orthogonal section rests on a wall of the fastening section which is opposite the end face, as a result of which the form-fitting coupling is made.

When the lines are completely coupled, the latching lug can be accommodated in the fastening section of the indentation. Accordingly, the latching lug is latched in the indentation, which achieves the form-fitting coupling.

Further advantages and features of the invention will become apparent from the following description and from the appended drawings, to which reference is made.

BRIEF DESCRIPTION OF THE DRAWINGS

FIG. 1 shows a schematic illustration of a line coupling assembly in an uncoupled state, FIG. 2 shows a schematic longitudinal section A-A of a line according to the invention of the line coupling assembly according to the invention according to FIG. 1.

DETAILED DESCRIPTION

Figure 3:
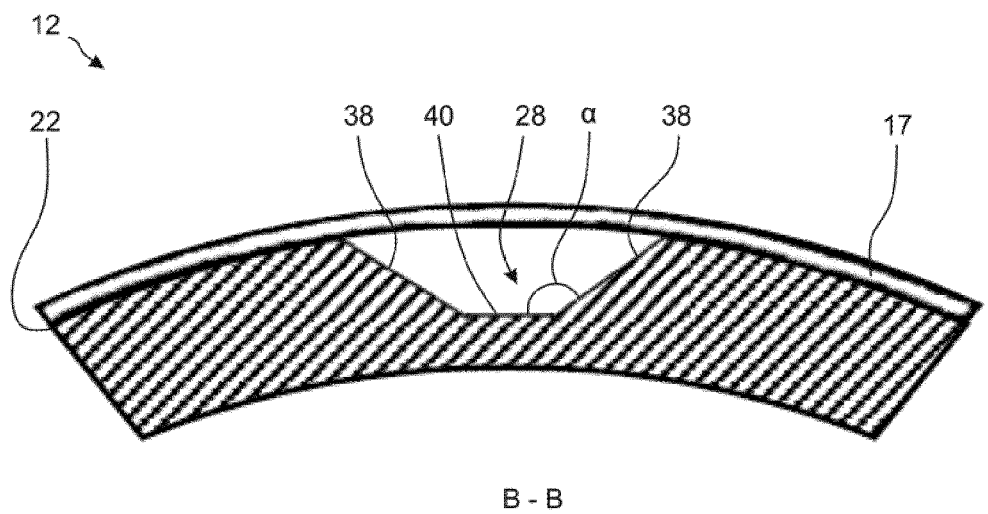
FIG. 3 shows a schematic cross section B-B of the line according to the invention according to FIG. 2.

A line coupling assembly 10, which is provided to couple fluid-carrying lines, is shown in FIG. 1.

The line coupling assembly 10 comprises a first line 12 and a second line 14, through which an appropriate fluid can flow. At their opposite ends, the lines 12, 14 each have parts of a coupling 16, via which the lines 12, 14 can be coupled to each other. The coupling 16 is also designated as line coupling.

The first line 12 here has a male end piece as part of the coupling 16, and the second line 14 here has a female end piece as part of the coupling 16.

The end pieces can be attached to the opposite ends of the lines 12, 14 as a separate part.

Alternatively, the end pieces can be formed in one piece on the lines 12, 14, so that the respective line 12, 14 also forms the respective end piece.

In principle, a fluidic connection between the lines 12, 14 is produced via the coupling 16 in its coupled state.

A seal 17 is provided on the first line 12. The seal 17 encloses the first line 12 in the circumferential direction or, in other words, extends along the entire circumference of the first line 12. Accordingly, the seal 17 constitutes an annular seal.

Each line 12, 14 has a coupling component 18 and 20, respectively, in the area of the coupling 16.

The coupling component 18 is formed as an indentation, which is arranged or formed in an outer wall 22 of the first line 12.

Starting from the coupling-side end face 24 of the first line 12, the indentation extends in an axial direction away from the coupling-side end face 24 in the direction of the seal 17.

The indentation ends in front of the seal 17.

The coupling component 18 or the indentation is accordingly arranged between the seal 17 and the coupling-side end face 24, seen in the axial direction.

The coupling component 18 comprises a guide section 26 and a fastening section 28.

The guide section 26 adjoins the coupling-side end face 24 and, starting therefrom, extends in an axial direction away from the coupling-side end face 24.

At a seal-side end or at an end opposite to the coupling-side end face 24, the fastening section 28 is flush with the guide section 26. The guide section 26 merges directly or indirectly into the fastening section 28.

The guide section 26 forms lateral guide walls 30, the distance of which in relation to one another decreases with increasing distance from the coupling-side end face 24. The guide walls 30 form a guide channel which, because of the decreasing distance between the guide walls 30, tapers toward the fastening section 28.

FIG. 2 shows a partial longitudinal section A-A of the first line 12.

At a distance from the coupling-side end face 24 and the coupling component 18, a groove 32 is formed in the outer wall 22 in the circumferential direction of the first line 12. The seal 17 is accommodated in this groove 32.

The groove 32 extends along the entire circumference of the first line 12.

Accordingly, the groove 32 constitutes an annular groove.

The fastening section 28 has a larger penetration depth into the wall 22 than the guide section 26. As a result, a step 34, which has a contact surface 36 opposite to the coupling-side end face 24, is formed between the fastening section 28 and the guide section 26.

As can be seen from FIG. 1, the coupling component 18 has two ramp sections 38 which, in the circumferential direction of the first line 12, directly adjoin the fastening section 28. Accordingly, the ramp sections 38 merge directly into the fastening section 28.

As revealed by FIG. 3, which shows a partial cross section B-B of the first line 12, the ramp sections 38 are angled at an angle α with respect to a base area 40 of the fastening section 28.

The ramp sections 38 connect the base area 40 of the fastening section 28 to a surface of the outer wall 22. The surface of the outer wall 22, the ramp areas of the ramp section 38 and the base area 40 of the fastening section 28 are thus connected to one another continuously, with no abrupt jumps, such as steps, for example, being provided.

The angle α lies in a range from 100° to 170°, in particular in a range from 120° to 150°, preferably in a range from 130° to 140°.

For example, the angle α is substantially 135°.

Figure 4:
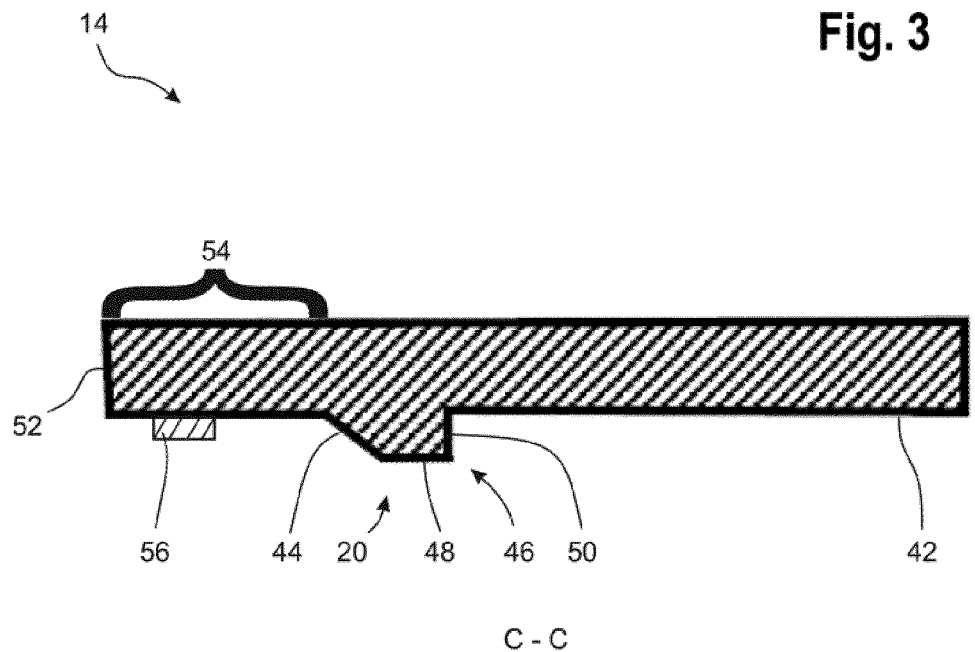
FIG. 4 shows a schematic longitudinal section C-C of a further line according to the invention of the line coupling assembly according to the invention according to FIG. 1.

A partial longitudinal section C-C of the second line 14 is illustrated in FIG. 4.

The coupling component 20 here is arranged on an inner wall 42 of the second line 14. The coupling component 20 here protrudes in a radial direction from the inner wall 42.

For example, the coupling component 20 is formed as a latching lug.

The coupling component 20 extends in the manner of a ramp in an axial direction toward the inner wall 42 to a coupling-side end of the second line 14. As a result, a wedge-shaped section is formed, which has a first sliding surface 44.

At an end of the coupling component 20 that faces away from the coupling-side end, the coupling component 20 has a step-shaped section 46, which comprises a second sliding surface 48 substantially parallel to the inner wall 42 and a contact surface 50 substantially orthogonal to the inner wall 42.

Between a coupling-side end face 52 and the coupling component 20, the second line 14 has an intermediate area 54.

A radially protruding sealing projection 56 can optionally be provided in the intermediate area 54.

Figure 5:
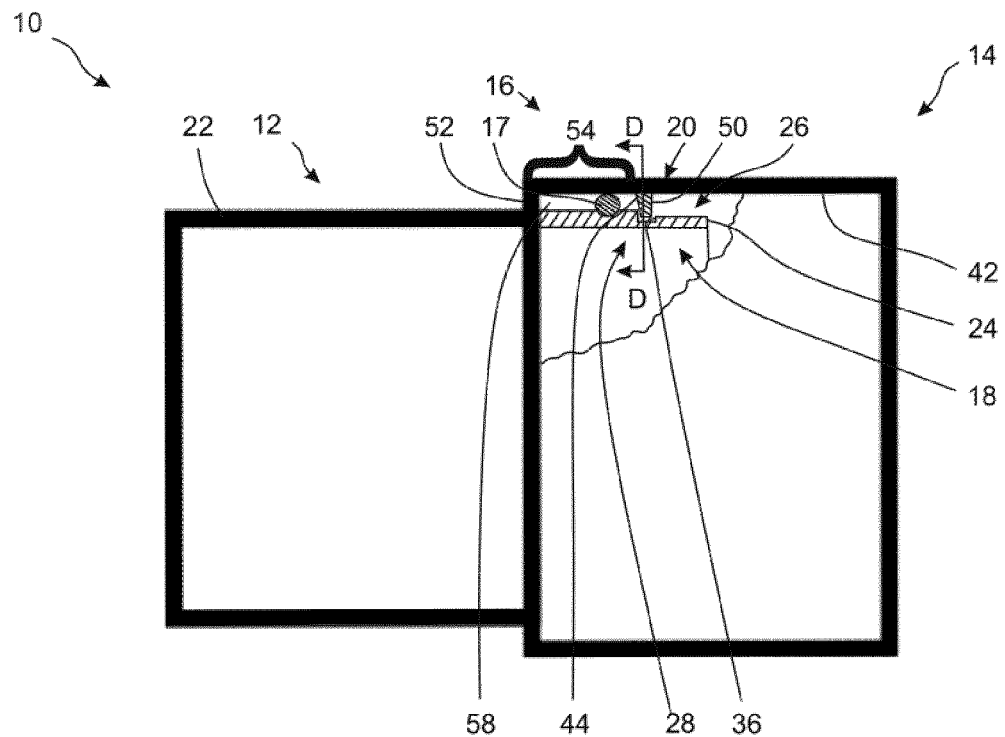
FIG. 5 shows a schematic illustration of the line coupling assembly according to the invention in a completely coupled state.

In FIG. 5, the line coupling assembly 10 is shown in a completely coupled state, an upper area of the second line 14 having been cut out.

Here, the first line 12 is pushed with its male end piece into the female end piece of the second line 14 in such a way that the coupling component 20 of the second line 14 is accommodated in the coupling component 18 of the first line 12. More precisely, the latching lug of the second line 14 extends into the fastening section 28 of the first line 12.

The contact surface 50 of the latching lug engages behind the contact surface 36 of the fastening section 28. In this way, a form fit is formed, which prevents the lines 12, 14 moving apart relative to each other in an axial direction.

In the intermediate area 54, which means between the coupling-side end face 52 and the coupling component 20, the seal 17 acts in a sealing manner on the inner wall 42 of the second line 14.

By means of the seal 17, a spacing or gap 58 between the outer wall 22 of the first line 12 and the inner wall 42 of the second line 14 is sealed off over the complete circumference of the coupling 16.

Optionally, the sealing protrusion 56 can interact with the seal 17 in order to seal off the gap 58.

Figure 6:
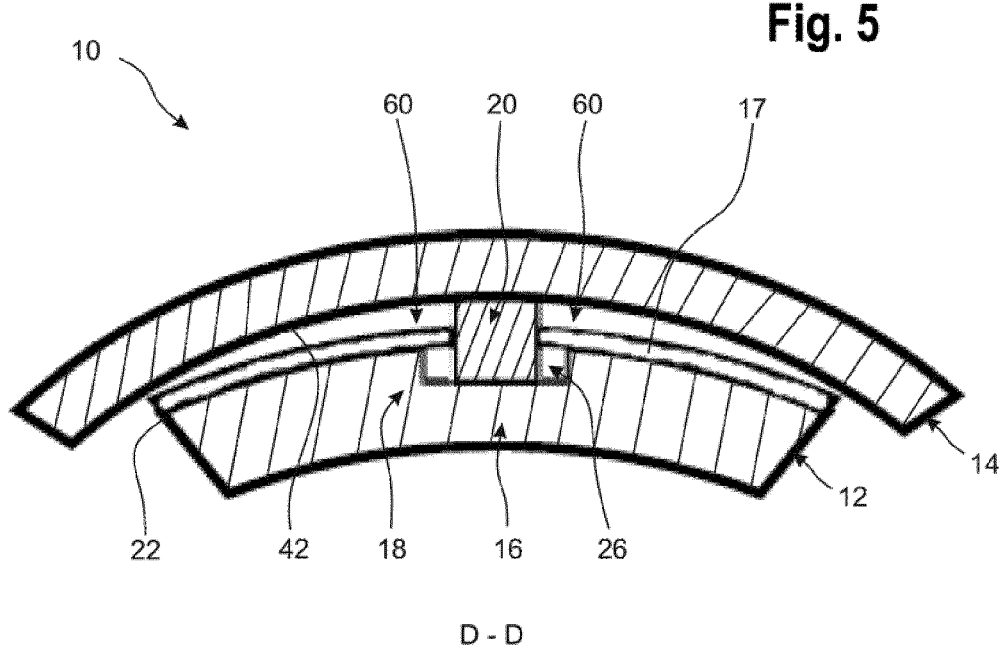
FIG. 6 shows a schematic cross section D-D of the line coupling assembly according to the invention according to FIG. 5.

FIG. 6 shows a partial cross section D-D of the line coupling assembly 10 in an incompletely coupled state.

Here, the coupling component 20 is not accommodated in the fastening section 28—as in the completely coupled state—but is located in the guide section 26.

Since the guide section 26 does not have such a large penetration depth as the fastening section 28, the distance between the outer wall 22 of the first line 12 and the inner wall 42 of the second line 14 is greater than in the completely coupled state. As a result, a substantially larger gap 58 which exceeds the height of the seal 17 is formed, so that the seal 17 can no longer act in a sealing manner on the inner wall 42.

The distance between the seal 17 and the inner wall 42 corresponds to a defined inspection gap 60.

The defined inspection gap has a defined size (height, width and/or length) which, for example, is defined via the radial distance of the second sliding surface 48 of the coupling component 20 from the inner wall 42 and/or via the penetration depth of the guide section 26 into the outer wall 22.

The coupling 16 is accordingly not tight in the area of the inspection gap 60, which produces a leak. This leak can be diagnosed easily and quickly.

Of course, the inspection gap 60 is also produced when the coupling component 20 is not arranged on the guide section 26 but, for example, also on the surface of the outer wall 22.

The coupling and uncoupling process is discussed below.

For the coupling, the lines 12, 14 are moved toward each other, so that the first line 12 penetrates the second line 14. The coupling-side end face 24 of the first line 12 is moved against the first sliding surface 44 of the coupling component 20 of the second line 14. The first sliding surface 44 slides on the coupling-side end face 24, so that the coupling component 20 is moved outward in a radial direction, as a result of which the entire wall of the second line 14 in the area of the coupling component 20 is outwardly deformed. In this phase, the inspection gap 60 is formed between the seal 17 and the inner wall 42. The coupling component 20 then slides with its second sliding surface 48 along the guide section 26 toward the fastening section 28. In this phase, the inspection gap 60 remains. During a further relative axial displacement of the coupling components 18, 20 in relation to each other, the coupling component 20 is accommodated completely in the fastening section 28 and latches in the fastening section 28, as a result of which the deformation of the wall of the second line 14 is eliminated. Thus, the inspection gap 60 is closed and the inner wall 42 bears in a sealing manner against the seal 17 over its entire circumference. The contact surface 50 of the coupling component 20 engages behind the contact surface 36 of the fastening section 28 or the coupling component 18. In this way, an axial displacement of the lines 12, 14 away from each other is prevented. Complete coupling of the lines 12, 14 is achieved.

To uncouple the two lines 12, 14, the two lines 12, 14 are rotated relative to each other in the circumferential direction. The coupling component 20 slides with its second sliding surface 48 out of the fastening section 28, over one of the ramp sections 38, onto the surface of the outer wall 22 of the first line 12. The inspection gap 60 is produced in this process. On the surface of the outer wall 22, the coupling component 20 and, accordingly, the entire line 14 can be pushed down axially from the first line 12, so that the two lines 12, 14 can be moved away from each other without problems. The lines 12, 14 are then completely uncoupled.

Thus, the uncoupling is carried out in a similar way to a bayonet connection.

The embodiments shown in the figures are to be understood merely by way of example. The features of the individual components can be interchanged or combined with one another as desired. Thus, for example, the seal 17 can be provided not on the outer wall 22 but on the inner wall 42. Alternatively or additionally, the coupling components 18, 20 can be interchanged.

The invention claimed is:

1. A line coupling assembly for a motor vehicle, comprising:
a line coupling;
a first line; and
a second line configured to be coupled to the first line via the line coupling,
wherein a coupling-side end of the first line and a coupling-side end of the second line each have a coupling component which are configured such that, when the first line and the second line are completely coupled, the coupling components interact in such a way that the first line and the second line are coupled tightly to each other,
wherein the coupling components are configured such that, when the first line and the second line are not completely coupled, the coupling components interact in such a way that there is a defined inspection gap between an outer wall of the first line and an inner wall of the second line in an area of the line coupling that is larger than when the first line and the second line are completely coupled,
wherein one of the coupling components is an indentation in one of the outer wall of the first line or the inner wall of the second line,
wherein the indentation, starting from a coupling-side end face of the one of the first line or the second line, extends away from the coupling-side end face in an axial direction,
wherein the indentation has a guide section and a fastening section,
wherein, starting from the coupling-side end face of the one of the first line or the second line, the guide section extends away from the coupling-side end face in an axial direction, and the fastening section adjoins the guide section in an axial direction at a distance from the coupling-side end face, and
wherein the fastening section, as viewed in a radial direction, is deeper than the guide section.

2. The line coupling assembly according to claim 1, wherein, when completely coupled, the coupling components interengage in a form-fitting manner.

3. The line coupling assembly according to claim 1, wherein, when completely coupled, the complete coupling is configured to be released by rotating the first line and the second line relative to each other in circumferential directions.

4. The line coupling assembly according to claim 1, further comprising:
a seal arranged in a respective circumferential direction on the outer wall of the first line or on the inner wall of the second line, in a circumferential groove in at least one of the outer wall of the first line or the inner wall of the second line,
wherein the seal is arranged between the outer wall of the first line and the inner wall of the second line when the first line and the second line are coupled.

5. The line coupling assembly according to claim 4, further comprising:

a radially protruding sealing projection which presses radially against the seal when the first line and the second line are completely coupled,
wherein the radially protruding sealing projection is provided on the outer wall of the first line on which the seal is not arranged, or on the inner wall of the second line on which the seal is not arranged.

6. The line coupling assembly according to claim 1, wherein the indentation ends in front of a seal in an axial direction,
wherein the seal is arranged in a respective circumferential direction on the outer wall of the first line or on the inner wall of the second line,
wherein the seal is arranged between the outer wall of the first line and the inner wall of the second line when the first line and the second line are coupled.

7. The line coupling assembly according to claim 1, wherein the fastening section is adjoined in the circumferential direction of a corresponding one of the first line or the second line by at least one ramp section, which connects a surface of the wall in which the indentation is arranged to a base area of the indentation.

8. The line coupling assembly according to claim 1, wherein the guide section has lateral guide walls which delimit a guide channel, the guide channel tapering from the coupling-side end face of the one of the first line or the second line toward the fastening section.

9. The line coupling assembly according to claim 1, wherein one of the coupling components comprises a latching lug protruding in a radial direction on one of the outer wall of the first line or the inner wall of the second line, wherein the latching lug is spaced further apart in an axial direction from a coupling-side end face of a corresponding one of the first line or the second line than a seal,
wherein the seal is arranged in a respective circumferential direction on the outer wall of the first line or on the inner wall of the second line,
wherein the seal is arranged between the outer wall of the first line and the inner wall of the second line when the first line and the second line are coupled.

10. The line coupling assembly according to claim 9, wherein the latching lug comprises a ramp extending in an axial direction toward the one of the outer wall of the first line or the inner wall of the second line to a coupling-side end of the corresponding one of the first line or the second line.

11. The line coupling assembly according to claim 9, wherein the latching lug extends at an end facing away from the coupling-side end of the corresponding one of the first line or the second line, extends substantially orthogonally toward the one of the outer wall of the first line or the inner wall of the second line, so that a step is formed.

12. The line coupling assembly according to claim 9, wherein, when the first line and the second line are completely coupled, the latching lug is accommodated in a fastening section of the indentation.

13. The line coupling assembly according to claim 1, wherein the guide section is formed as a guide channel, and wherein the guide channel, as viewed in the radial direction, is deeper than a wall surface of the wall in which the indentation is arranged.

* * * * *